United States Patent [19]

Sigworth, Jr.

[11] 4,413,615
[45] Nov. 8, 1983

[54] PASSIVE SOLAR ENERGY WATER PREHEAT SYSTEM USING NON-FREEZING HEAT TRANSPORT MEDIUMS

[75] Inventor: Harry W. Sigworth, Jr., Orinda, Calif.

[73] Assignee: Chevron Research Company, San Francisco, Calif.

[21] Appl. No.: 267,193

[22] Filed: May 26, 1981

[51] Int. Cl.³ .............................................. F24J 3/02
[52] U.S. Cl. .................................. 126/434; 126/419; 126/435; 137/433; 137/533.11; 251/11; 236/93 R
[58] Field of Search ............... 126/419, 422, 423, 434, 126/435; 137/433, 429, 430, 533.11, 533.13, 533.15, 468, 564, 337, 340; 236/93 R, 99 J; 251/11, 368

[56] References Cited

U.S. PATENT DOCUMENTS

| | | | |
|---|---|---|---|
| 1,971,242 | 8/1934 | Wheeler | 126/434 X |
| 2,842,155 | 7/1958 | Peters | 137/468 X |
| 4,050,508 | 9/1977 | Buckley | 165/32 |
| 4,103,673 | 8/1978 | Woodworth et al. | 126/422 X |
| 4,137,964 | 2/1979 | Buckley | 165/1 |
| 4,326,499 | 4/1982 | Koskela | 126/435 X |

FOREIGN PATENT DOCUMENTS 1242310  6/1959  France
11-11290036  3/1936  Japan

*Primary Examiner*—Larry Jones
*Attorney, Agent, or Firm*—D. A. Newell; E. J. Keeling; R. H. Evans

[57] ABSTRACT

A sealed thermosiphoning solar energy system is disclosed which uses oil as a nonfreezing transport fluid. The oil is heated in an absorber exposed to the sun's radiation, passes through a check valve and into thermal exchange with a second fluid. Expansion means are provided to prevent excessive pressure buildup in the system.

9 Claims, 4 Drawing Figures

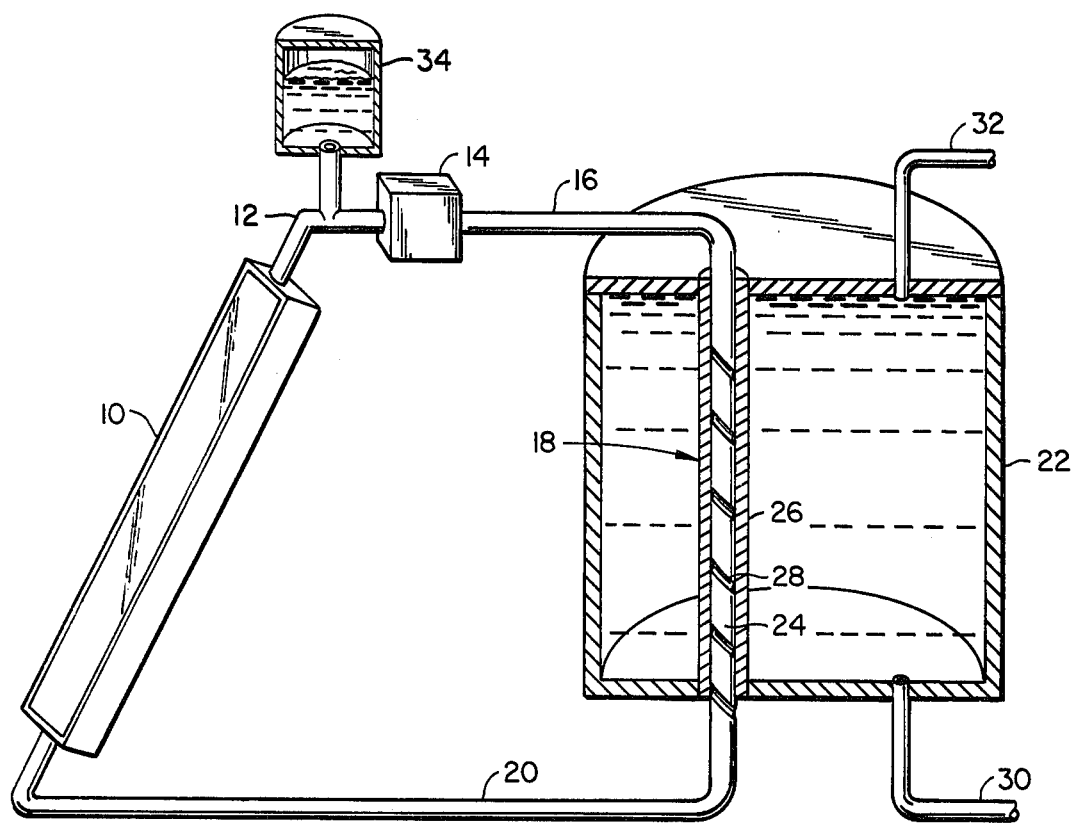
FIG._1.
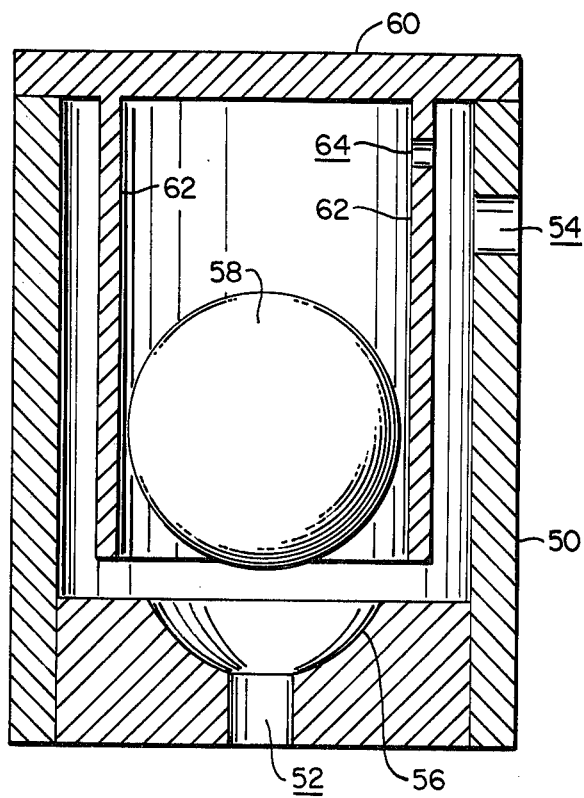
FIG._2.

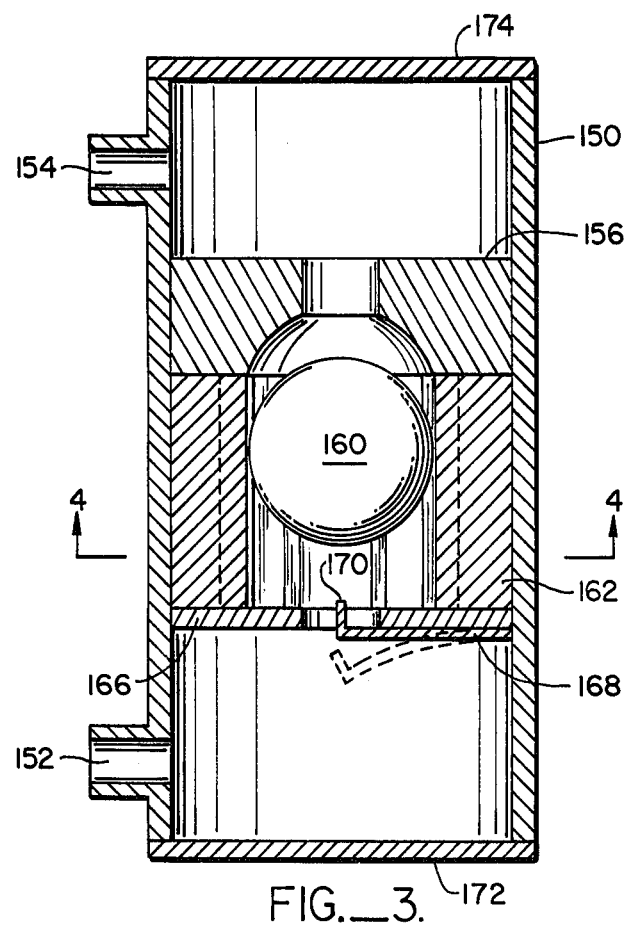
FIG._3.
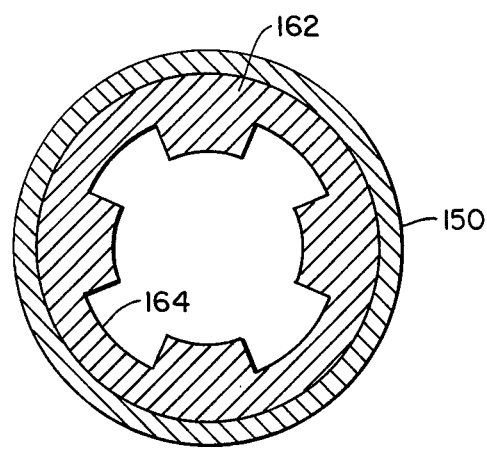
FIG._4.

PASSIVE SOLAR ENERGY WATER PREHEAT SYSTEM USING NON-FREEZING HEAT TRANSPORT MEDIUMS

RELATED APPLICATIONS

This application is related to application Ser. No. 259,294, filed on Apr. 30, 1981, by Harry W. Sigworth, Jr.

BACKGROUND OF THE INVENTION

1. Field of the Invention

The present invention finds principal application within the field of passive solar energy systems. More particularly, the invention relates to a thermosiphon solar energy system which is suitable for preheating water.

2. Prior Art

With the dwindling supplies of fossil fuel and the accompanying increasing energy cost, extensive research efforts are being focused to harness solar radiation on a practical and economical scale. One type of device which shows promise in the field is the passive thermosiphon system, described in U.S. Pat. Nos. 4,137,964 and 4,050,508, issued to Bruce Shawn Buckley. As disclosed in the above references, a "thermic diode" panel collects and stores the sun's radiant energy. The panel typically comprises a shallow, rectangular box that is effectively, divided into two chambers by a slab of insulation. The chambers are filled with a liquid, such as water, and are in open communication with each other at the top and at the bottom of the panel.

Solar radiation, incident on the outer panel face, will heat the water in the collector chamber. As the water is heated, it expands and passes upwardly through the collector chamber and into the cooler storage chamber. Cooler water from the storage chamber, in turn, passes to the bottom of the warmer collector chamber.

Heat may be taken from the storage chamber by means of a simple demand coil heat exchanger as shown in U.S. Pat. No. 4,050,508.

The use of a demand exchanger, however, requires a rather large heat exchange surface area, which, in turn, increases the overall unit cost. Furthermore, the use of water as a heat transport fluid introduces numerous problems, if the unit must perform in freezing temperature extremes.

It is therefore an objective of the present invention to provide an alternative system to the prior art which may be economically manufactured and which will overcome the deficiencies thereof.

SUMMARY OF THE INVENTION

The present invention relates to a solar energy system which is particularly suitable for preheating hot water. The system is basically comprised of a passive thermosiphon loop in which heat is transferred by a circulating transport liquid from an absorber exposed to the sun's radiation to a heat exchanger in thermal contact with a second fluid. The absorber is inclined to the horizontal and has flow passages therethrough for the circulation of the heat transport liquid at a positive pressure of normally less than 5 atmospheres. Preferably, the transport liquid is an oil, which remains in a normally liquid state in the temperature range $-40°$ F. ($-40°$ C.) to $400°$ F. ($204°$ C.). Examples of such oils are silicone oils and numerous commercially available heat transfer oils, such as "Brayco 888" heat transfer liquid. Light guage steel is a preferred material of construction for the absorber since it is a low cost material, and there are minimal freezing or corrosion problems whenever oil is used as a transport liquid.

A conduit loop for the removal of hot transport liquid from the top of the absorber and the return of cool transport liquid to the bottom of the absorber is provided. Reverse flow in the loop is prevented by the use of a control valve disposed in the conduit.

Preferably the valve is of the ball check type wherein a ball member, movably disposed in the valve housing above a valve seat, has a density greater than the oil at or blow the specificed normal operating temperature and has a density less than the oil above the normal operating temperature. Such a valve will thus operate as a normal check valve at the normal operating temperatures, but will disengage from the valve seat if the operating temperature is above the specified normal to allow reverse thermosiphoning as a safety feature.

A second preferred value uses a buoyant movably disposed element between an upper primary seat and a lower auxiliary seat. The movable element is designed to have a density less than the fluid at or below the normal operating temperature and a density greater than the fluid above the specified normal operating temperature.

Means are provided for exchanging thermal energy from the hot transport liquid in the conduit loop to a higher pressure, cooler second fluid. This means is preferably comprised of a double-wall, tube type of heat exchanger. A single-wall heat exchanger may be used if the fluid in the transport loop is non-toxic. The tube is preferably provided by the conduit loop and has a surrounding housing of sufficient strength to withstand the pressure of the second fluid, which in most cases, will be tap water.

BRIEF DESCRIPTION OF THE DRAWING

FIG. 1 illustrates a preferred embodiment of the present invention which is suitable for the preheating of tap water to a hot water heater.

FIG. 2 illustrates a preferred embodiment of a valve for use in the present invention.

FIG. 3 illustrates a second preferred embodiment of a valve for use in the present invention.

FIG. 4 illustrates a cross-section of an element of FIG. 3 taken along line 4—4.

DETAILED DESCRIPTION OF THE PREFERRED EMBODIMENT

Referring to the drawings, and to FIG. 1 in particular, there is shown a preferred embodiment of the present invention. The system is basically comprised of a closed passive thermosiphon loop through which heat is transferred via a circulating transport liquid, such as a commercial heat transfer fluid, from an absorber exposed to the sun's radiation to a heat exchanger in thermal contact with a second fluid. Under normal operating conditions, flow is maintained in a clockwise circulation pattern with respect to the thermosiphon loop shown in FIG. 1. The flow of heat transport liquid is generally from the top of absorber 10 through line 12 to valve 14, from valve 14 through line 16 to heat exchange tubing 18, and from tubing 18 back to the absorber via line 20. The second fluid, in turn, is heated by the circulating heat transfer fluid in housing 22.

The absorber 10 may be manufactured from a number of materials, although steel is the preferred construction material for use with an oil transport liquid. Commercial oil heat transfer fluids, such as "Brayco 888", which do not freeze or boil within the potential extreme operating temperature ranges of −40° F. (−40° C.) to 400° F. (204° C.) are preferred heat transfer mediums.

Referring now to FIG. 2 of the drawings, there is shown a cross-section of a preferred valve for use in this invention. As shown therein, there is provided a housing 50 having lower and upper ports 52 and 54, respectively, for the passage of liquid therethrough. There is also provided a spherically shaped valve seat 56 having an aperture through which all fluid passing through the valve must flow. Although the valve seat is shown as a separate part in the figure, the seat may be manufactured directly from the housing walls. If the valve seat is separately fabricated, as indicated in the drawing, it can be secured to the inner housing walls in any conventional manner. A spherical valve member 58 is movably disposed within the housing above valve seat 56.

While the shapes of the valve seat and mating valve member are preferably spherical, other shapes may also be used.

Valve member 58 will preferably have a density greater than but quite close to the density of the liquid flowing through the valve at its normal operating temperature to minimize the pressure drop and increase the valve sensitivity. Thus, if the system is installed for preheating water to a hot water heater, the collector loop heat transfer oil will normally be heated to a temperature in the range of 70° F. (21.2° C.) to 180° F. (82.2° C.) before passing through the valve. At these temperatures, the density of "Brayco 888" heat transfer fluid, for example, ranges from 50.2 lb/ft$^3$ (0.805 g/cm$^3$) to 47.5 lb/ft$^3$ (0.762 g/cm$^3$) and the density of the valve member will preferably be no greater than 105% and more preferably, no greater than 101% of the oil density.

Under normal operating conditions, the heated water from absorber 10 will pass upwardly through line 12 (see FIG. 1) into the lower port 52 (see FIG. 2) of the valve. The upward flow and pressure forces will displace valve member 58 from seat 56, thereby permitting the oil to flow around the member and out through port 54. However, if the oil is warmer in tubing 18 than in absorber 10, the oil will tend to flow from the tubing 18 through line 16 to absorber 10. The force of gravity, in combination with fluid forces, under these conditions, will cause member 58 to lodge in valve seat 56 thereby preventing reverse thermosiphon flow.

Although no special materials of construction are required for the valve housing and seat, apart from those dictated by standard engineering considerations, the valve member 58 is designed so that at temperatures above the desired operating temperature, the member will become buoyant in the circulating fluid.

In general, materials may be selected for the valve member which have a density greater than the heat transport oil at the operating temperature and which thermally expand at rates faster than the oil to become buoyant at the higher temperatures. For example, the valve member may be constructed from high thermal expansion epoxy resin using small glass spheres as filler.

Cap 60 conventionally seals the top of housing 50 and provides a means of access to the interior thereof. Extending from the bottom of cap 60 is a guide cylinder 62 having an inner diameter greater than the diameter of spherical valve member 58. The lower end of guide member 62 preferably extends at least below the center of seated member 58. Whenever member 58 is unseated the spherical member will be confined to travel within the interior regions of guide cylinder 62, thereby preventing obstruction of port 54 and aiding in reseating of the member under appropriate conditions. Relief aperture 64, provided near the top of cylinder 62, permits fluid to escape from the interior of the guide cylinder if the valve member is moving upwardly and permits fluid to enter the cylinder if the valve member is moving downwardly. Although the size of the aperture is not critical, a one-eighth inch diameter hole has been found satisfactory.

With a guide means, such as cylinder 62, the valve may be inclined as much as 70° from the vertical axis, and the valve member will still seat properly under flow rates typically encountered in thermosiphon systems.

Referring now to FIG. 3 of the drawings, there is shown a cross-section of a second preferred embodiment of a valve suitable for use in this invention. As shown therein, there is provided a housing 150 having lower and upper ports 152 and 154, respectively, for the passage of liquid therethrough. There is also provided a primary valve seat 156 and an auxiliary valve seat 166 having central apertures through which all liquid passing through the valve must flow. A spherical valve element 160 is movably disposed within the housing between the seats.

While the shapes of the primary valve seat and mating valve member are preferably spherical, other shapes may be used. Valve element 160 will preferably have a density less than but quite close to the density of the liquid flowing through the valve at its normal operating temperature to minimize the pressure drop and increase the valve sensitivity. The density of the valve member will normally be no less than 95% and preferably no less than 99% of the circulating liquid density.

Under normal operating conditions, the heated liquid from absorber 10 will pass upwardly through line 12 (see FIG. 1) into the upper port 154 (see FIG. 3) of the valve. The downward flow forces will displace buoyant valve element 160 from seat 156, thereby permitting the liquid to flow downwardly through the valve and out through port 152. However, if the liquid is warmer in tubing 18 than in absorber 10, the liquid will tend to flow from the tubing through line 16 to the absorber. The buoyant force under these conditions, however, will cause member 160 to lodge in valve seat 156 thereby preventing reverse thermosiphon flow.

Guide means are preferably used to insure proper seating of the movable ball element. As indicated in the figure, a guide cylinder 162 is placed below valve seat 156 in abutting relationship. The cylinder has a central circular aperture therein which is preferably slightly larger than the diameter of valve member 160. A plurality of longitudinal grooves or channels 164 are cut into the inner walls of the cylinder to provide a passageway for fluid flow around the movable element whenever the element is dislodged from its upper spherical seat (see FIG. 4). Preferably guide cylinder 162 will have a length less than one valve member diameter.

Circular valve seat 166 is provided at the lower end of guide cylinder 162 for receiving valve member 160. A temperature dependent bimetallic strip 168 having a projecting tang 170 is provided to prevent the spherical ball element from seating in the auxiliary valve seat 166 under normal temperature conditions. At higher temperatures, however, the strip bends downward as indicated in the dashed outline of FIG. 3 to permit seating of the valve member.

At temperatures above the desired operating temperature, the valve member is designed such that it will become more dense than the circulating fluid. In general, the construction materials will be selected which have a density less than the heat transport fluid at the operating temperature and which thermally expand at rates slower than the fluid to become more dense than the fluid at the higher temperatures. One such valve construction for use with commercially available heat transport oil which meets this criteria is low thermal expansion epoxy resin with hollow spherical filler glass balls.

At high temperatures, such as temperatures above 180° F. (82.2° C.), it becomes desirable to prevent further heating of the water in the storage chamber. This is achieved by the present embodiment since the ball member will attain a density greater than the thermosiphoning fluid and become lodged in the auxiliary seat 166, thereby preventing further circulation of the hot heat transport fluid from the absorber to the storage unit.

Caps 172 and 174 conventionally seal the ends of housing 150 and provide a means for access to the interior thereof.

Hot transport liquid effluent from valve 14 passes through piping 16 into a double-wall exchanger, generally referred to by reference numeral 18, encased within housing 22. Exchanger 18 is preferably comprised of two heat conducting concentric pipes 24 and 26. Inner pipe 24 is provided with spiral or longitudinal grooves 28 on the exterior surface thereof to permit oil to escape from the exchanger assembly in the event of a leak in pipe 24 or to permit water to escape in the event of a leak in pipe 26. Housing 22 will also have inlet and outlet pipes 30 and 32, respectively, for the introduction and removal of the second fluid therefrom. In the preferred installation for the preheating of water to a hot water heater, the inlet second fluid will comprise cold tap water at line pressure and the thermosiphon oil loop will normally be maintained at a positive static pressure of less than 5 atmospheres. Preferably, the housing 22 is sized sufficiently large to provide intermediate demand capacity for the system. This permits the double wall exchanger 18 to be of minimum area since heat exchange from the collector to the second fluid will be spread over a longer period of time.

An expansion chamber 34 is provided in open communication with the thermosiphon loop to prevent rupture of the conduit or damage to the absorber as a result expansion of the heat transport fluid with increasing temperature. The chamber, having a volume in excess of the maximum anticipated fluid expansion volume, is preferably partially filled with a gas, such as nitrogen, which is compressed as the fluid expands. Other expansion means, such as liquid-liquid dip legs and expandable diaphragms are also within the spirit and scope of this invention. The expansion chamber will preferably keep the static pressure at the top of the thermosiphon loop below 5 atmospheres.

What is claimed is:

1. A solar energy system for preheating water to a hot water heater, which comprises:
   a metal absorber inclined to the horizontal having flow passages therethrough for the thermosiphoning circulation of heat transport fluid at a positive pressure of less than five atmospheres, said fluid being in a normally liquid state over the temperature range, −40° C. to 204° C.;
   a conduit loop for the removal of hot transport fluid from the top of the absorber and the return of cool transport fluid to the bottom of the absorber;
   expansion chamber means disposed in said conduit for preventing excessive pressure increases in the thermosiphon loop as a result of thermal expansion of the heat transport fluid;
   a valve disposed in said conduit having a housing with a lower fluid port for normally receiving fluid from the top of said absorber and an upper fluid port; a valve seat interposed in said housing between said ports;
   a valve member movably disposed in said housing above the valve seat, which has a density greater than the fluid at or below the specified normal operating temperature and a density less than the fluid above the specified normal operating temperature, which valve member will sealingly engage the valve seat to prevent the downward flow of fluid if the operating temperature is at or below the specified normal operating temperature, but which will disengage from the valve seat to permit the upward flow of fluid, and which will also disengage from the valve seat to permit the downward flow of fluid if the operating temperature is above the specified normal operating temperature; and
   double wall exchanger means in said conduit for transferring heat from said hot transport fluid to a second fluid; and
   said valve being disposed in the conduit between the expansion chamber means and the double wall heat exchanger.

2. A solar energy system as recited in claim 1 wherein said valve member has a density less than five percent greater than the transport fluid density at the normal operating temperature.

3. A solar energy system for preheating water to a hot water heater, which comprises:
   a metal absorber inclined to the horizontal having flow passages therethrough for the thermosiphoning circulation of heat transport fluid at a positive pressure of less than five atmospheres, said fluid being in a normally fluid state over the temperature range, −40° C. to 204° C.;
   a conduit loop for the removal of hot transport fluid from the top of the absorber and the return of cool transport fluid to the bottom of the absorber;
   expansion chamber means disposed in said conduit for preventing excessive pressure increases in the thermosiphon loop as a result of normal expansion of the heat transport fluid;
   a valve disposed in said conduit having a housing with an upper fluid port for receiving effluent fluid from the top of said absorber and a lower fluid port; a primary valve seat interposed in said housing between said ports; a secondary valve seat interposed in said housing between said ports below said primary valve seat; a valve member movably disposed in said housing between said primary and said secondary valve seats which has a density less than the fluid at or below the specified normal operating temperature and a density greater than the fluid above the specified normal operating temperature, which valve member will sealingly engage the primary valve seat to prevent the upward flow of fluid if the operating temperature is at or below the specified normal operating temperature, which will disengage from the primary valve seat to permit the downward flow of fluid but which will engage the secondary valve seat to prevent said downward flow of fluid if the operating temperature is above the specified normal operating temperature; and double wall heat exchanger means in said conduit for transferring heat from said hot transport fluid to water at line pressure.

4. A solar energy system as recited in claim 3, wherein said valve further comprises guide means between said valve seats for receiving the valve member.

5. A solar energy system as recited in claim 4, wherein said heat transport fluid is an oil.

6. A solar energy system as recited in claim 4, wherein said heat transport fluid is a silicone oil.

7. A solar energy system as recited in claim 4, wherein said absorber is steel.

8. A solar energy system as recited in claim 4 wherein said valve further comprises means to block said valve member from seating in the secondary valve seat as a result of downward flow forces whenever said liquid temperature is at or below the specified normal operating temperature.

9. A valve as recited in claim 8 wherein said means includes a temperature dependent bi-metallic strip having a projecting tang which interferes with the downward movement of said valve member towards said secondary seat whenever the fluid temperature is at or below the specified normal operating temperature.

* * * * *